United States Patent Office 3,830,784
Patented Aug. 20, 1974

3,830,784
SHELF-STABLE ADHESIVE COMPOSITIONS FOR LAMINATING ELASTOMERS TO METAL AND TEXTILE SUBSTRATES AND SUCH LAMINATES
Louie G. Manino, and Frederick H. Sexsmith, Erie, Pa. assignors to Lord Corporation, Erie, Pa.
No Drawing. Filed Mar. 22, 1972, Ser. No. 237,071
Int. Cl. C08g 22/00
U.S. Cl. 260—77.5 R                    6 Claims

ABSTRACT OF THE DISCLOSURE

Shelf-stable adhesive compositions for bonding metal and textile substrates to elastomers during vulcanization comprising a solution of one or more polyisocyanates and an acidic halogen-containing polymer in which a poly-C-nitroso aromatic compound is suspended.

BACKGROUND OF THE INVENTION

A need has existed in the art for a shelf-stable single-component adhesive system which can be utilized to bond a variety of substrates including metal substrates, and organic substrates, including leather, fabrics, cords, and the like, to a variety of vulcanizable elastomers during vulcanization to form a strong adhesive bond between the substrate and the elastomer. Such an adhesive system should be capable of standing for long periods of time without gelling or pasting, provide effective bonding with a single application, and cure at vulcanization temperatures.

U.S. Pat. No. 3,282,883 discloses an adhesive composition which contains chlorosulfonated polyethylene, dinitrosobenzene and a sterically hindered orthoalkoxy aryl diisocyanate. This adhesive, the stability of which is primarily due to the lack of reactivity of the particular diisocyanate employed, is useful primarily as a rubber to metal adhesive although it can be used for bonding elastomers to each other and to other solid substrates such as fabrics. Pat. No. 2,835,624 discloses that filaments, fibers, cords and fabrics treated with a solution of a butyl rubber containing an organic isocyanate and a dinitrosobenzene form an improved bond with butyl rubber upon vulcanization of the rubber. The adhesive composition of this invention provides improvements over those of the aforementioned patents. U.S. Pat. No. 3,051,666, discloses an adhesive composition which contains chlorosulfonated polyethylene, sulfur, carbon black, chlorinated rubber, and polymethylene polyphenyl isocyanate in xylene as a solvent. The adhesive is disclosed as useful for bonding elastomers to metals.

It is the principal object of this invention to provide a novel improved adhesive composition which is shelf-stable as a single package.

It is another object of this invention to provide an extremely versatile adhesive composition useful in bonding a wide variety of substrates, including metals, and organic substrates including leather, fabrics, cord, and the like, to a wide variety of vulcanizable elastomers during vulcanization.

A further object is to provide an adhesive composition which produces high bond strength when cured at moderate or high temperatures.

Another object is to provide an improved solvent-based adhesive composition containing one or more polyisocyanates which are normally reactive at room temperature and above, an acidic halogen-containing polymer and a poly-C-nitroso aromatic compound, which does not gel on standing for long periods of time and which provides the desired bond after a single application.

Still another object of the invention is to provide an adhesive composition which remains effective and tack free after application to metallic or organic substrates, thereby enabling excellent layover of the treated substrate before being combined with an elastomer.

Yet another object of this invention is to provide an adhesive composition which can be applied to a leather, fabric, cord, or the like, and not seriously affect the physical properties of the leather, fabric or cord even after a layover of significant duration.

These and other objects and advantages of the invention will become apparent from a consideration of the following specification and claims.

DETAILED DESCRIPTION OF THE INVENTION

This invention relates to a novel shelf-stable adhesive composition, and, more particularly, it relates to a solvent based composition containing one or more polyisocyanates normally reactive at room temperature, an acidic halogen-containing polymer and a poly-C-nitroso aromatic compound, which composition has an extended shelf life and which is capable of bonding a variety of metallic and organic substrates such as leather, fabrics, cords, and the like, to a wide variety of vulcanizable elastomers during vulcanization.

The adhesive compositions of the present invention are solutions of one or more polyisocyanates normally reactive at room temperature, and an acidic halogen-containing polymer having a poly-C-nitroso aromatic compound suspended therein in which the polyisocyanate is present in an amount between about 5 and about 60%, the halogen-containing polymer is present in an amount between about 10 and about 70%, and the poly-C-nitroso aromatic compound is present in an amount between about 2 and about 35%, said percentages being by weight based on the total weight of these ingredients, and the solids content of the composition being between about 5% and about 50%. The preferred adhesive composition is a solution of polymethylene polyphenylisocyanate and chlorosulfonated polyethylene having a dinitrosobenzene suspended therein, the proportions of the ingredients being as specified above.

The above-described adhesive composition has marked advantages over currently available adhesives. The adhesive has great versatility, being capable of bonding a wide variety of substrates including metallic and organic substrates. Suitable metallic substrates include any of the common structural metals including iron, steel, including stainless steel, lead, aluminum, copper, brass, bronze, Monel metal, nickel, zinc, and the like. The organic substrates include leather, and all common textile materials such as polyester, polyamide, rayon and cotton fabrics, cords and the like. Such substrates are bonded to a wide variety of vulcanizable elastomers, including natural rubber, styrene-butadiene rubber (SBR) of both high and low durometer grades and oil-extended types; neoprene (G and W types); butyl rubber, ethylene-propylene terpolymer rubber; butadiene-acrylonitrile rubber; chlorosulfonated polyethylene rubber; and the like. In general, the adhesive solution is applied to the substrates, and dried; the adhesive coated material is then applied to the vulcanizable elastomer and on subsequent curing of the elastomer, the resulting assembly is bonded into a unitary body having high bond strength between the elastomer and the substrate. In addition to fabrics, cords, yarns, filaments and fibers, sheet materials can also be coated with the adhesive and bonded to elastomer substrates.

The polyisocyanates useful in the invention are those which are normally reactive at room temperature or above. More specifically, operable diisocyanates include toluene diisocyanate (TDI); methylene di-(phenylisocyanate) (generally referred to as MDI); triphenyl methane triisocyanate; naphthalene diisocyanate, and the like.

The preferred diisocyanate is polymethylene polyphenylisocyanate, a liquid polyfunctional isocyanate, which may be approximated by the formula:

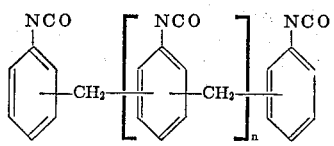

wherein $n$ has an average value from 0 to 1. The polymethylene polyphenylisocyanates for use in the adhesive compositions of this invention are well known commercially available materials.

Suitable acidic halogen-containing polymers include halogenated elastomers such as chlorinated natural rubber, chlorinated ethylene-propylene terpolymer, brominated polydichlorobutadiene, chlorinated polyvinyl chloride, and the copolymer of 2, 3-dichlorobutadiene and α-chloroacrylonitrile and the like. These polymers are known in the art for their utility in elastomer bonding compositions. All of these materials have a tendency to be slightly acidic in nature due to the release of hydrohalogen acids, i.e., hydrochloric or hydrobromic acid.

The preferred acidic halogen-containing polymers are chlorosulfonated polymers of polyethylene which are amorphous materials which, by themselves, have little utility as adhesives. They generally contain from about 10 to about 60% (preferably 15 to 45%) of chlorine and from about 0.1 to about 5% (preferably 0.5 to 2.5%) of sulfur. It is believed that most of the chlorine is substituted along the hydrocarbon chain and that the sulfur is combined with the chlorine being attached to the chains as sulfonyl chloride groups. The substitution is believed to be random, and, in a preferred polymer, there is an average of about one chlorosulfonyl group for every 17 carbon atoms. Chlorosulfonated polyethylene polymers are available commercially in various grades differing as to density, molecular weight, and the like. Any one, or mixtures, of these grades may be used. In general it may be said the chlorosulfonated polyethylenes have over 20 carbon atoms and molecular weights over 1000. U.S. Pat. 2,405,971 discloses a method of making a chlorosulfonated polyethylene.

A wide variety of poly-C-nitroso aromatic compounds are operable in the present invention, including those listed in U.S. Pat. No. 2,905,582, which is hereby incorporated by reference. The preferred dinitroso compounds are m- and p-dinitrosobenzenes, of which the latter is especially preferred for economic reasons.

In the preferred adhesive composition of the present invention, the polyisocyanates will be present in an amount between about 5 and about 60%; the acidic halogen-containing polymer will be present in an amount between about 10 and about 70%, and the poly-C-nitroso aromatic compound will be present in an amount between about 2 and about 25%; these percentages being by weight and based on the combined weight of the three stated materials. Especially preferred compositions of the present invention will contain between about 25 and about 50% of polymethylene polyphenylisocyanate; between about 30 and about 60% of chlorosulfonated polyethylene, and between about 4 and about 20% of dinitrosobenzene.

To prepare the adhesive compositions of the invention, the acidic halogen-containing polymer is dissolved in one of the well known solvents therefor, and in which the polyisocyanate is also soluble or dispersible, but in which the poly-C-nitroso aromatic compound is substantially insoluble. Such solvents include aromatic hydrocarbons like benzene, toluene, xylene, and the like; chlorinated hydrocarbons like trichloroethylene, perchloroethylene, and the like; and combinations thereof, such as combinations of an aromatic hydrocarbon and a chlorinated hydrocarbon. The dinitrosobenzene is added to the solution of polymers in finely-divided form and suspended therein. The solids content (including the acidic halogen-containing polymer and the polyisocyanate) of the resulting mixture will be between about 5 and about 50%, by weight, preferably between about 15 and about 40%.

Various additives such as fillers, and the like, may be included in the adhesive compositions in proportions known in the art. Such fillers may enhance the viscosity and other properties desirable from the standpoint of application of the adhesive. Fillers include finely divided substantially inert solid materials, like carbon black, silica and titanium dioxide (pigment grade).

In use the adhesive compositions of this invention may be applied to various substrates by dipping, brushing, spraying, etc. The amount of adhesive applied will vary with the application method, material to which applied and the elastomer to be bonded thereto. For most organic textile applications a pick-up of 3 to 15%, by weight, of the adhesive based on the weight of the untreated textile, will provide satisfactory results. The adhesive coated yarn, filaments, fiber, cord or fabric is then dried by removal of solvent. This may be accomplished under ambient conditions, e.g., room temperature, or by the use of heat or forced air. Room temperature drying generally takes about 15 to 30 minutes, whereas drying at elevated temperatures can vary from six minutes at 250° F. to two minutes at 400° F. The dried film of adhesive is essentially tack-free. For application to metal substrates the adhesive compositions may be used full strength or diluted up to 100% by volume with a suitable solvent and applied by conventional dip, spray or brush coating methods.

An important aspect of this invention resides in the excellent layover characteristics of the adhesive-coated substrates. Thus, products coated with an adhesive of the invention may be stored in a clean, dry area for bonding at a later time. The adhesive-coated substrates, although stored for a month or longer, still provide excellent adhesion to vulcanizable elastomers.

The adhesive coated substrates may be bonded to elastomers by application of the adhesive coated material to vulcanizable elastomer and curing the elastomer. Curing of the elastomer also causes curing of the adhesive and bonding of the substrate to the elastomer. Depending upon the particular elastomer, curing can be carried out at temperatures ranging from about 240° F. to about 400° F. for a time commensurate with the temperature employed. Curing may require as long as several hours at relatively low temperatures, e.g., 240° F., whereas at the higher temperatures, curing may occur in a few minutes. For most elastomers, representative curing conditions are 288° F. to 320° F. for 5 to 30 minutes.

The following examples are set forth to further illustrate this invention.

EXAMPLE 1

An adhesive was prepared by dissolving 10 parts of chlorosulfonated polyethylene ("Hypalon," Grade #40 of E. I. du Pont de Nemours Company), and 10 parts of polymethylene polyphenylisocyanate ("PAPI" of Upjohn Company) in a combination of 43 parts of xylene and 104 parts of trichloroethylene. 1 part of p-dinitrosobenzene and 5 parts of carbon black were dispersed in the polymer solution. The solids content was 15%.

The composition had an apparent viscosity of 225 cps. (Brookfield Viscometer, No. 2 spindle, 30 r.p.m., 77° F.) A sample thereof stored for six months in closed container at 70° F. showed no evidence of gel formation. The stability of the adhesive composition was further evaluated by determining the viscosity of the adhesive after accelerated storage in a closed container for 30 days at 130° F. The viscosity was found to be 265 cps., indicating only moderate gelation and good stability. The bonding strength of the adhesive was not adversely affected by the accelerated storage conditions.

It was not necessary to scrupulously free the total system of water. Nor did open exposure to moisture-laden air seem to hurt. When an open container of the adhesive was exposed to the ambient atmosphere for 21 days, it did not gel.

EXAMPLE 2

This Example illustrates the versatility of the adhesive composition of Example 1 in bonding fabrics coated therewith to a variety of vulcanizable elastomers. The various rubber stocks employed in this and the other Examples herein are designed A, B, C, D and E. Rubber stock A is a natural rubber stock composed of 100 parts, by weight, of smoked sheet, 3 parts of zinc oxide, 2 parts of stearic acid, 1 part of N-phenyl-beta-naphthylamine, 40 parts of carbon black (high abrasive furnace), 0.6 part of N-oxydiethylene benzothiazole-2-sulfenamide and 2.15 parts of sulfur; rubber stock B is a polychloroprene stock composed of 100 parts, by weight, of polychloroprene (Neoprene GNA), 75 parts of carbon black (fine thermal), 10 parts of naphthenic process oil (sp. g. of 0.9230, SUS viscosity at 100° F. of 156), 5 parts of zinc oxide, 4 parts of magnesia, 2 parts of N-phenyl-beta-naphthylamine, 1 part of petrolatum, 1 part of stearic acid and 1 part of sulfur; rubber stock C is buna N stock composed of 100 parts of buna N (butadiene-acrylonitrile copolymer), 1 part of stearic acid, 10 parts of terpene polymer, M.P. 10° C., predominately a polymer of beta-pinene ("Piccolyte S-10" of Pennsylvania Industrial Chemical Corp.), 10 parts of dibutyl phthalate, 5 parts of zinc oxide, 65 parts of carbon black (furnace), 0.3 part of tetramethyl thiuram monosulfide and 1 part of sulfur; rubber stock D is an SBR stock composed of 100 parts SBR (butadiene styrene copolymer), 50 parts of carbon black (high abrasive, furnace), 5 parts of zinc oxide, 1 part of stearic acid, 8 parts of saturated polymerized petroleum hydrocarbons, sp. g. 0.95–1.02, viscosity, Saybolt Furol, at 140° F., 250–350 seconds ("Para-Flux" of the C. P. Hall Co.), 1.75 parts of sulfur and 1.25 parts of N-cyclohexyl-2-benzothiazole-sulfenamide; and rubber stock E is a butyl rubber stock composed of 100 parts of butyl rubber, 1 part of stearic acid, 5 parts of zinc oxide, 50 parts of carbon black (high abrasive furnace), 1 part of benzothiazyl disulfide, 1.5 parts tellurium diethyl-dithiocarbamate and 1 part of sulfur.

The adhesive composition was applied to several 4.5" x 6.5" pieces of polyester fabric and dried for 30 minutes until tack free. The coated fabric was sandwiched between two 5" x 7" x ⅛" pads of the particular elastomer and the resulting assembly was wrapped with masking tape. The assembly was cured for 30 minutes at 307° F. and allowed to stand overnight. One inch strips of the cured assembly were cut and pulled at an angle of 180° on a tensile tester at a speed of 2 in./min. The pull values in pounds per inch are set forth in Table I.

TABLE I

| Elastomer | Pull, lbs./in. |
|---|---|
| Natural rubber (stock A) | 98 |
| Styrene-butadiene rubber (stock D) | 96 |
| Neoprene (stock B) | 103 |
| Butyl rubber (stock E) | 77 |
| Butadiene-acrylonitrile rubber (stock C) | 72 |

EXAMPLE 3

This example illustrates the use of the adhesive composition of Example 1 in preparing fabric-rubber laminates. The adhesive was coated on 4" x 3" pieces of nylon fabric and dried. Each piece of the coated fabric was passed through mill rolls in superimposed position with a 5" x 7" by 1/10" thick piece of an elastomer. The elastomers used were natural rubber, styrene butadiene rubber and neoprene. The spacing between the mill rolls was slightly less than 1/10". Each resultant laminate was then cured for 1½ hours at 250° F. under no pressure. Good adhesion was obtained between the fabric and elastomer.

EXAMPLE 4

This example further illustrates the versatility of the adhesive composition of Example 1 in bonding a variety of textile materials to the previously described vulcanizable elastomers. The textile materials to which the adhesive composition was applied and the several elastomers to which the coated material was bonded are identified in Table II. The Table also sets forth the conditions under which the adhesive was dried and the conditions employed in curing the elastomer-adhesive coated product assembly. Peel adhesion values for each cured assembly are reported for each sample, the values being obtained in accordance with the procedure set forth in Example 2, using a 180° separation angle. The results obtained are expressed in terms of where failure occurred in the assembly, e.g. the adhesive coated material, the elastomer or the bond line.

TABLE II

| | | Adhesive drying conditions | | Cure conditions | | |
|---|---|---|---|---|---|---|
| Adhesive coated material | Elastomer | Time (min.) | Temp. (° F.) | Time (min.) | Temp (° F.) | Test results |
| 1. Untreated cotton fabric | Natural rubber | | [1] R.T. | 30 | 307 | Failure in cotton. |
| 2. Untreated polyester cord | Neoprene | 5 | 300 | 30 | 307 | Failure in neoprene. |
| 3. Scoured, heat set nylon | Nitrile | 15 | [2] 300 | 30 | 307 | Failure in nitrile. |
| 4. Rayon | Styrene butadiene (SBR) | 10 | [2] 300 | 30 | 307 | Failure in SBR. |
| 5. Scoured, heat set nylon | Butyl | 10 | [2] 300 | 30 | 320 | Failure in butyl. |
| 6. Polyester cord | Styrene butadiene (SBR) | 2 | 400 | 30 | 307 | Failure in SBR. |

[1] R.T.=Room temperature.
[2] Adhesive coated material dried at room temperature before further drying specified.

EXAMPLE 5

This example illustrates an adhesive composition utilized as a rubber to metal adhesive. The adhesive was prepared by dissolving 25 parts of chlorosulfonate polyethylene (a mixture of "Hypalon," Grades 30 and 40 of E. I. du Pont de Nemours Company in a ratio of 4 parts of the former to 1 part of the latter), and 20 parts of polymethylene polyisocyanate ("PAPI" of the Upjohn Company) in a mixture consisting of 120 parts of trichloroethylene and 140 parts of xylene. 10 parts of p-dinitrosobenzene and 10 parts of carbon black (Philblack S315 of Phillips Petroleum Co.) were dispersed in the polymer solution. The solids content was 20%.

This composition had an apparent viscosity of 260 cps. (Brookfield Viscometer, No. 2 spindle, 30 r.p.m., 77° F.) and was utilized to bond a series of EPDM rubber elastomers to steel. A typical elastomer employed in this series of tests was an ethylene-propylene terpolymer rubber having the following composition:

| Ingredients: | Parts by weight |
|---|---|
| "Royalene" 400* | 40 |
| "Royalene" 512* | 80 |
| Carbon black (FEF) | 85 |
| Zinc oxide | 5 |
| Zinc stearate | 1.5 |
| Oil (Sunpar 2280) | 50 |
| Accelerators and Curing Agents: | |
| MBT | 3 |
| Tuex | 0.8 |
| Butazate | 1.5 |
| Sulfur | 0.7 |
| Sulfasan R | 0.8 |

*Ethylene-propylene terpolymer rubber available from Uniroyal.

The adhesive was applied to primed metal coupons by dipping. The adhesive coated parts were allowed to dry, and then assembled, vulcanized and tested in accordance with ASTM procedure D429–68 Method B, modified to 45° angle. Vulcanization time of the EPDM rubber was 30 minutes at 307° F. A bond strength of 131 lbs./in. was obtained in the peel test with failure entirely in the EPDM elastomer.

The excellent bonding ability, coupled with the stability both of the adhesive composition *per se* and of the adhesive coated products, is quite surprising.

EXAMPLE 6

The procedure of Example 1 was repeated substituting toluene diisocyanate (TDI) for the polymethylene polyphenylisocyanate (PAPI) to produce a stable adhesive composition of the invention which was utilized to bond natural rubber (stock A above) to primed steel according to the procedure of Example 5. Two different samples of the resulting laminate were tested by ASTM procedure 429–68 Method B, modified to 45° angle and found to have peel strengths of 40 and 48 lbs./in., respectively, for an average value of 44 lbs./in.

EXAMPLE 7

An adhesive was prepared by dissolving 10 parts (47.6%) of chlorosulfonated polyethylene ("Hypalon" Grade #40) and 10 parts (47.6%) of polymethylene polyphenylisocyanate ("PAPI") in a combination of 43 parts of xylene and 9 parts of trichloroethylene. One part (4.8%) of dinitrosobenzene and 5 parts of carbon black were dispersed in the polymer solution together with 6 parts of Hi-Sil 223. The solids content of the polyisocyanate and acidic polymer was about 15%. This adhesive was employed in bonding a natural rubber (stock A above) to a polyester fabric according to the procedure of Example 2. A strong bond resulted, similar to those of the foregoing Examples.

In order to develop a rational explanation for the unexpected shelf-life qualities of the present adhesive, it has been theorized that the acidic halogen-containing polymer component of the adhesive acts as an acidic buffer or base scavenger, thereby providing long term stability to the adhesive. Chlorosulfonated polyethylene, for example, has sulfonyl chloride groups extending from the polyethylene backbone. These sulfonyl chloride groups are free to react with the amines produced when the polyisocyanate combines with any water present in the adhesive forming a stable sulfonamide and eliminating the possibility of amine-isocyanate catalysis. This same acidic or base-scavenging function of the chlorosulfonated polyethylene obviates the base catalyzed hydrolytic degradation of the fiber, cord, or the like, to which the adhesive is applied. This, also, is an important attribute, since it is recognized that isocyanates in general, have a destructive effect on certain synthetic fiber, such as polyester fibers and cord.

EXAMPLE 8

In order to test our theory that the acidic-halogen-containing polymers are responsible for the unexpected shelf-life of the adhesive compositions of the present invention by acting as an acidic buffer or base scavenger, an adhesive was prepared employing a neutral polymer rather than an acidic polymer according to the invention. The procedure of Example 1 was repeated substituting cellulose acetate butyrate for the chlorosulfonated polyethylene. The resulting adhesive composition eventually gelled on storage after several months, whereas the composition prepared employing the chlorosulfonated polyethylene (Hypalon) in Example 1 remained in a useful condition indefinitely after the composition of this Example had gelled and become useless.

In other similar experiments, non-yellowing polymethylene polyisocyanate prepolymer compositions were made up employing neutral vinyl chloride-vinyl acetate copolymer on the one hand and the chlorosulfonated polyethylene (Hypalon) on the other. In neither case was the alloying component scrupulously freed of traces of moisture, which of course tends to cure such polyisocyanate compositions. Again on standing, the vinyl resin-containing compositions increased in viscosity, whereas the viscosity of the chlorosulfonated polyethylene compositions remained virtually unchanged. It was also noted that even catalyzed films of the chlorosulfonated polyethylene polyisocyanate alloys were more sluggish to moisture (ambient) cure than the vinyl alloyed formulations.

The procedure of Example 1 may be employed to produce a variety of shelf stable adhesive compositions of the invention containing from 5 to 60% of a suitable polyisocyanate of the type normally reactive at room temperature, such as methylene di-(phenylisocyanate), triphenyl methane triisocyanate or naphthalene diisocyanate, and 10 to 70% of an acidic halogen-containing polymer such as chlorinated natural rubber, chlorinated ethylene-propylene terpolymer, brominated polydichlorobutadiene, chlorinated polyvinyl chloride, copolymers of 2,3-dichlorobutadiene and α-chloroacrylonitrile. in which is suspended about 2 to 35% of a poly-C-nitroso aromatic compound such as those listed in U.S. Pat. 2,905,582 or preferably, m- and p-dinitrosobenzene; the solids content of such compositions ranging from about 5 to 50%.

The compositions described above are illustrative of other which will now be apparent to those skilled in the art from the present disclosure and are not to be construed as limiting the appended claims.

What is claimed is:

1. An adhesive composition consisting essentially of a solution of a polyisocyanate normally reactive at room temperature and an acidic halogen-containing polymer in which is suspended a poly-C-nitroso aromatic compound in which the polyisocyanate is present in an amount between about 5 and about 60%, the acidic-halogen-containing polymer is present in an amount between about 10 and about 70%, and the poly-C-nitroso aromatic compound is present in an amount between about 2 and about 35%, said percentages being by weight based on the combined weight of the three stated ingredients, and the solids content of the composition being between about 5 and about 50%, said composition being characterized by an acidity sufficient to substantially reduce isocyanate reactivity.

2. The adhesive composition of claim 1 wherein the polyisocyanate is polymethylene polyphenylisocyanate, the acidic-hydrogen containing polymer is chlorosulfonated polyethylene and the poly-C-nitroso aromatic compound is a dinitrosobenzene.

3. The adhesive composition of claim 1 wherein the solids content of the composition is between about 15 and about 40%.

4. The adhesive composition of claim 1 wherein the polyisocyanate is present in an amount between about 25 and about 50%, the acidic halogen-containing polymer is present in an amount between about 30 and about 60%, and the poly-C-nitroso aromatic compound is present in an amount between about 4 and about 20%.

5. The adhesive composition of claim 4 wherein the solids content of the composition is between about 15 and about 40%.

6. The adhesive composition of claim 4 wherein the polyisocyanate is polymethylene polyphenylisocyanate, the acidic halogen-containing polymer is chlorosulfonated polyethylene and the poly-C-nitroso aromatic compound is a dinitrosobenzene.

References Cited

UNITED STATES PATENTS 3,282,883   11/1966   De Crease et al. ___ 260—878 R

M. J. WELSH, Primary Examiner

U.S. Cl. X.R.

252—182; 260—41 B, 41 R, 41.5 R, 79.5 C, 878 R, 899